US012192321B2

(12) United States Patent
Xu et al.

(10) Patent No.: US 12,192,321 B2
(45) Date of Patent: Jan. 7, 2025

(54) PRIVATE VERTICAL FEDERATED LEARNING

(71) Applicant: International Business Machines Corporation, Armonk, NY (US)

(72) Inventors: Runhua Xu, Pittsburgh, PA (US); Nathalie Baracaldo Angel, San Jose, CA (US); Hayim Shaul, Kfar Saba (IL); Omri Soceanu, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 210 days.

(21) Appl. No.: 17/875,987

(22) Filed: Jul. 28, 2022

(65) Prior Publication Data
US 2024/0039692 A1  Feb. 1, 2024

(51) Int. Cl.
*H04L 9/00* (2022.01)
*G06N 20/00* (2019.01)

(52) U.S. Cl.
CPC .............. *H04L 9/008* (2013.01); *G06N 20/00* (2019.01)

(58) Field of Classification Search
CPC ................................. G06N 20/00; H04L 9/008
See application file for complete search history.

(56) References Cited

U.S. PATENT DOCUMENTS

| | | | |
|---|---|---|---|
| 11,188,791 B2 | 11/2021 | Choudhury et al. | |
| 11,743,238 B2 * | 8/2023 | Gharibi | G06F 18/24 706/3 |
| 2020/0358599 A1 * | 11/2020 | Baracaldo Angel | G06F 21/6227 |
| 2021/0012225 A1 * | 1/2021 | Sathya | G06N 5/04 |
| 2021/0174243 A1 | 6/2021 | Angel et al. | |
| 2021/0174257 A1 * | 6/2021 | Pothula | G06F 16/27 |
| 2021/0248244 A1 * | 8/2021 | Liu | G06N 5/04 |

(Continued)

FOREIGN PATENT DOCUMENTS

WO  2021047535 A1  3/2021

OTHER PUBLICATIONS

Z. Zhang, X. Li and S. Yang, "Data Pricing in Vertical Federated Learning," 2022 IEEE/CIC International Conference on Communications in China (ICCC), Sanshui, Foshan, China, 2022, pp. 932-937. (Year: 2022).*

(Continued)

*Primary Examiner* — Kari L Schmidt
(74) *Attorney, Agent, or Firm* — Garg Law Firm, PLLC; Rakesh Garg; Steven Bouknight

(57) ABSTRACT

A second set of data identifiers, comprising identifiers of data usable in federated model training by a second data owner, is received at a first data owner from the second data owner. An intersection set of data identifiers is determined at the first data owner. At the first data owner according to the intersection set of data identifiers, the data usable in federated model training is rearranged by the first data owner to result in a first training dataset. At the first data owner using the intersection set of data identifiers, the first training dataset, and a previous iteration of an aggregated set of model weights, a first partial set of model weights is computed. An updated aggregated set of model weights, comprising the first partial set of model weights and a second partial set of model weights from the second data owner, is received from an aggregator.

20 Claims, 10 Drawing Sheets

(56) References Cited

U.S. PATENT DOCUMENTS

| | | | |
|---|---|---|---|
| 2021/0409197 A1 | 12/2021 | Baracaldo Angel et al. | |
| 2022/0076133 A1* | 3/2022 | Yang | G06N 3/044 |
| 2022/0101054 A1* | 3/2022 | Abouzeid | G06N 3/084 |
| 2022/0147873 A1* | 5/2022 | Zhang | G06F 9/5027 |
| 2022/0255764 A1* | 8/2022 | Li | G06F 21/606 |
| 2022/0358417 A1* | 11/2022 | Liu | G06N 20/00 |
| 2022/0366220 A1* | 11/2022 | Roth | G06N 3/08 |
| 2022/0398343 A1* | 12/2022 | Ou | G06N 20/00 |
| 2023/0028606 A1* | 1/2023 | Cheng | H04L 9/008 |
| 2023/0068770 A1* | 3/2023 | Cheng | G06N 3/098 |
| 2023/0216668 A1* | 7/2023 | Zhang | G06N 3/048 |
| | | | 713/189 |
| 2023/0316062 A1* | 10/2023 | Balevi | G06N 3/04 |
| | | | 706/25 |
| 2023/0334333 A1* | 10/2023 | Zheng | G06N 3/098 |
| 2023/0342491 A1* | 10/2023 | Gilmore | G06F 21/554 |
| 2023/0409965 A1* | 12/2023 | Hsu | G06N 3/084 |
| 2023/0409983 A1* | 12/2023 | Aradhyula | G06N 3/045 |
| 2024/0005341 A1* | 1/2024 | Ouyang | G06N 20/00 |
| 2024/0054205 A1* | 2/2024 | Goodsitt | G06F 21/44 |
| 2024/0062072 A1* | 2/2024 | Wang | G06N 3/098 |

OTHER PUBLICATIONS

Xu, Runhua, et al. "Fedv: Privacy-preserving federated learning over vertically partitioned data." Proceedings of the 14th ACM workshop on artificial intelligence and security. 2021, pp. 181-192. (Year: 2021).*

Zhu, Hangyu, et al. "PIVODL: Privacy-preserving vertical federated learning over distributed labels." IEEE Transactions on Artificial Intelligence 4.5 (2021): 988-1001. (Year: 2021).*

Li et al., Preserving Data Privacy via Federated Learning: Challenges and Solutions, IEEE Consumer Electronics Magazine 9.3 (2020): pp. 8-16, Apr. 8, 2020.

Xu et al., FedV: Privacy-Preserving Federated Learning over Vertically Partitioned Data, Jun. 16, 2021.

Bouacida et al., Vulnerabilities in Federated Learning, IEEE Access, vol. 9, pp. 63229-63249, May 3, 2021.

Smietanka et al., Federated Learning for Privacy-preserving data access, Nov. 10, 2020.

Wu et al., Exploiting Record Similarity for Practical Vertical Federated Learning, Jun. 11, 2021.

Cheng et al., SecureBoost: A Lossless Federated Learning Framework, IEEE Intelligent Systems, Apr. 7, 2021.

Hardy et al., Private federated learning on vertically partitioned data via entity resolution and additively homomorphic encryption, Nov. 29, 2017.

Yang et al., A Quasi-Newton Method Based Vertical Federated Learning Framework for Logistic Regression, Dec. 4, 2019.

Chen et al., VAFL: a Method of Vertical Asynchronous Federated Learning, Jul. 12, 2020.

Wang et al., Hybrid Differentially Private Federated Learning on Vertically Partitioned Data, Sep. 6, 2020.

Gascon et al., Privacy-Preserving Distributed Linear Regression on High-Dimensional Data, Proceedings on Privacy Enhancing Technologies, Jun. 2, 2017.

Gu et al., Federated Doubly Stochastic Kernel Learning for Vertically Partitioned Data, 26th ACM SIGKDD International Conference on Knowledge Discovery & Data Mining, Aug. 14, 2020.

Zhang et al., Secure Bilevel Asynchronous Vertical Federated Learning with Backward Updating, Mar. 1, 2021.

Romanini et al., Pyvertical: A Vertical Federated Learning Framework for Multi-Headed SPLITNN, ICLR 2021—Workshop on Distributed and Private Machine Learning (DPML), Apr. 14, 2021.

Fu et al., VF2Boost: Very Fast Vertical Federated Gradient Boosting for Cross-Enterprise Learning, SIGMOD/PODS '21: Proceedings of the 2021 International Conference on Management of Data, pp. 563-576, Jun. 20-25, 2021.

* cited by examiner

PRIVATE VERTICAL FEDERATED LEARNING

BACKGROUND

The present invention relates generally to a method, system, and computer program product for model training. More particularly, the present invention relates to a method, system, and computer program product for private vertical federated learning.

For simplicity, a dataset can be treated as if arranged as a matrix, in which each row of the matrix holds a data record and each column of the matrix refers to a single feature or data attribute. For example rows in dataset A might hold data of customers 1, 2, and 3, while columns in dataset A might be labelled as customerID (a customer identifier), popcorn (how many bags of popcorn the customer has purchased per month), and yogurt (how many containers of yogurt the customer has purchased per month).

Federated learning refers to collaborative training of a machine learning model without revealing training data to other parties participating in the training. Federated learning uses multiple data owners, each contributing a portion of the model training data. Typically, an aggregator system broadcasts its global model to data owners, who each update the global model by performing a learning, or model training, process using their own data and send the resulting updated partial model to the aggregator. The aggregator then updates its global model based on the individual data owners' updated partial models, and repeats the process until the global model is deemed sufficiently trained. Using federated learning divides the learning task into portions that are executed in parallel, to decrease overall training time, and avoid the need to store what can be a very large training dataset on one system.

In horizontal federated learning, each data owner's dataset includes the same features. In vertical federal learning, each data owner's dataset need not include all of the same features. For example, dataset A might hold customers' grocery purchase data, and dataset B might hold viewers' movie viewing data. A content recommendation service is interested in training a model to predict content a user might be interested in based on correlations between grocery purchase data and past viewers' movie viewing.

Entity resolution is a technique to identify data records that refer to the same real-world entity (such as a customer, location, and the like) and link the records together. For example, address formats in two datasets might vary, a customer might be entered in one dataset with a salutation and in another without, a customer's name might be entered in one dataset with a middle name and in another without, or the same customer might be entered in one dataset with a formal first name and in another using a nickname. As data records maintained by multiple data owners often vary, entity resolution is often important in implementing vertical federated learning.

Set intersection is a multi-party protocol that allows at least two parties, each holding datasets with a common feature, to compute the intersection of the datasets—in other words, rows from each dataset that refer to the same entity. The same entity is determined using entity resolution techniques. For example, all datasets might be indexed using matching telephone numbers, address data that matches above a threshold amount of similarity (e.g. addresses that have above a 90% similarity to each other are deemed to match), name similarity above a threshold amount of similarity, and the like. Private set intersection is the performance of set intersection using a cryptographic protocol that allows parties to compute the intersection of the datasets by comparing encrypted versions of these sets.

Symmetric cryptography is a cryptographic system that uses a single shared secret, or key, to both encrypt and decrypt a message. The secret is typically a relatively large random number generated using a pseudo-random number generator.

Public-key cryptography, or asymmetric cryptography, is a cryptographic system that uses pairs of keys, a public key (which may be known to others) and a private key (which may not be known by anyone except the owner). In such a system, any person can encrypt a message using the intended receiver's public key, but that encrypted message can only be decrypted with the receiver's private key. A secret—typically a relatively large random number generated using a pseudo-random number generator—is used to generate a pair of keys suitable for use asymmetric cryptography.

Homomorphic encryption is an asymmetric encryption scheme that also supports addition and multiplication operations on encrypted data. Thus, if a+b=c, adding the encrypted forms of a and b and decrypting the result produces c. Similarly, if a*b=d, multiplying the encrypted forms of a and b together and decrypting the result produces d.

SUMMARY

The illustrative embodiments provide a method, system, and computer program product. An embodiment includes a method that receives, at a first data owner from a second data owner, a second set of data identifiers, the second set of data identifiers comprising identifiers of data usable in federated model training by the second data owner. An embodiment determines, at the first data owner by comparing the second set of data identifiers with a first set of data identifiers, an intersection set of data identifiers, the first set of data identifiers comprising identifiers of data usable in federated model training by the first data owner, the intersection set of data identifiers consisting of data identifiers present in both the first set of data identifiers and the second set of data identifiers. An embodiment rearranges, at the first data owner according to the intersection set of data identifiers, the data usable in federated model training by the first data owner, the rearranging resulting in a first training dataset, the first training dataset comprising a set of labels. An embodiment computes, at the first data owner using the intersection set of data identifiers, the first training dataset, and a previous iteration of an aggregated set of model weights, a first partial set of model weights. An embodiment receives, from an aggregator, an updated aggregated set of model weights, the updated aggregated set of model weights comprising the first partial set of model weights and a second partial set of model weights received at the aggregator from the second data owner.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
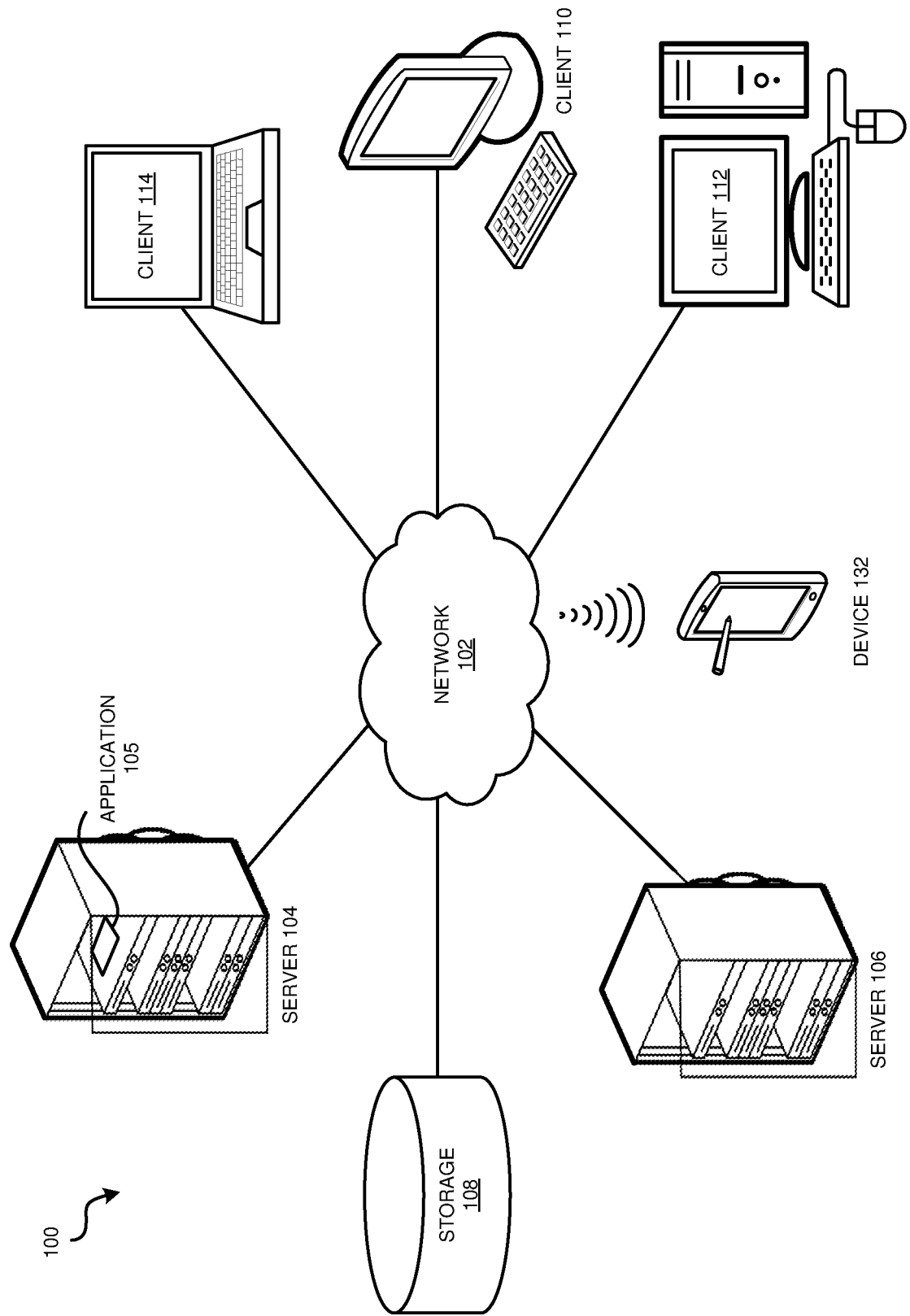
FIG. 1 depicts a block diagram of a network of data processing systems in which illustrative embodiments may be implemented.

The illustrative embodiments recognize that data security is a problem in vertical federated learning. Entity resolution requires that data owners exchange information about the data they include, but data owners prefer that other parties do not learn data in their own databases, including which records are held by which data owners and the number of records that appear in the intersection of two or more databases.

The illustrative embodiments also recognize that some presently available federated learning techniques require peer-to-peer communication between data owners, making it difficult to extend the learning to scenarios involving more than two data owners. It is also easier to establish a connection with an aggregator than directly with other peers. Other presently available federated learning techniques rely on approximation techniques, reducing model accuracy. As well, data owners prefer not to share data with the aggregator and that data not leak through the aggregator to another data owner. It is also possible to infer data from intermediate model updates sent between data owners and the aggregator. Thus, the illustrative embodiments recognize that there is a need for a vertical federated learning solution that is private—in other words, in which the participating parties do not learn any information except what is explicitly provided to them or what they already know. In particular, the illustrative embodiments recognize that there is a need for a vertical federated learning solution in which intermediate model updates are not visible to the aggregator or in transit, data owners' data is not shared with other parties, all parties have the same view of the records shared between them, parties communicate only through the aggregator (not peer-to-peer), parties can join and drop out of the learning process dynamically, and that supports more than two data owners' participation in the federated learning process.

The illustrative embodiments recognize that the presently available tools or solutions do not address these needs or provide adequate solutions for these needs. The illustrative embodiments used to describe the invention generally address and solve the above-described problems and other problems related to private vertical federated learning.

An embodiment can be implemented as a software application. The application implementing an embodiment can be configured as a modification of an existing federated model learning system, as a separate application that operates in conjunction with an existing federated model learning system, a standalone application, or some combination thereof.

Particularly, some illustrative embodiments provide a method that receives a second set of data identifiers from a second data owner, determines, by comparing the second set of data identifiers with a first set of data identifiers of a first data owner, an intersection set of data identifiers, rearranges the data usable in federated model training by the first data owner according to the intersection set, computes a partial set of model weights using the intersection set, the training dataset, and a previous iteration of an aggregated set of model weights, sends the partial set of model weights to an aggregator, and receives, from the aggregator, an updated aggregated set of model weights.

An embodiment performing data owner functionality is referred to herein as a data owner embodiment. An embodiment performing aggregator functionality is referred to herein as an aggregator embodiment. Some data owner embodiments do not communicate directly with each other; instead, the data owner embodiments communicate through an aggregator embodiment. In other embodiments, data owner embodiments collaborate to perform aggregator functions as well, thus also acting as aggregator embodiments.

In embodiments implementing encrypted data communications between a data owner embodiment and an aggregator embodiment, the embodiments use one or more encryption keys to encrypt and decrypt their communications, using presently known techniques. In one set of embodiments, an aggregator embodiment uses a presently known technique to generate a public-private encryption key pair, or receives a public-private encryption key pair from another source, and provides the public key to one or more data owner embodiments for use in decrypting model weight data communicated from the aggregator embodiment. In one set of embodiments, the aggregator embodiment generates one key pair, and provides all data owner embodiments with the same public key. In another set of embodiments, the aggregator embodiment generates multiple key pairs, and provides data owner embodiments with different public keys. In another set of embodiments, the aggregator embodiment generates separate key pairs for each data owner, and provides each data owner embodiment with its own public key. Other presently available secure multi-party computation techniques, in which parties jointly compute a function over their inputs while keeping those inputs private, are also usable in implementing encrypted data communications between a data owner embodiment and an aggregator embodiment. For example, one type of shared secret is Beaver triples, sets of three values, with portions shared among the communicating parties, in which two of the values are random numbers and the third is the product of the two random numbers. Data communicated between a data owner embodiment and an aggregator embodiment need not be encrypted using homomorphic encryption.

In embodiments implementing encrypted data communications between data owner embodiments using a secure tunnel through an aggregator embodiment, the embodiments use one or more encryption keys to encrypt and decrypt their communications, using presently known encryption techniques. In one set of data owner embodiments, the data owner embodiments share a secret that the aggregator embodiment does not have access to. In some data owner embodiments, the secret is an encryption key usable to both encrypt and decrypt a message using a presently available technique. Other data owner embodiments use the secret to generate a public-private encryption key pair using a presently available technique. Because the data owner embodiments share the secret, they will generate the same key pair. To send data using a secure tunnel through an aggregator embodiment, a data owner embodiment encrypts the data (e.g. using the shared key or the public key), and sends the encrypted data to the aggregator embodiment. The aggregator embodiment forwards the encrypted data to one or more data owner embodiments, which decrypt the data (e.g. using the shared key or the private key). Because the aggregator embodiment does not have access to the secret or key(s), the aggregator embodiment cannot decrypt the data being forwarded.

In other embodiments implementing encrypted data communications between data owner embodiments through an aggregator embodiment, a data owner embodiment encrypts the data (e.g. using a public key provided by the aggregator embodiment), and sends the encrypted data to the aggregator embodiment. The aggregator embodiment (or another embodiment performing aggregator functions) decrypts the data (e.g. using its private key), re-encrypts the data (e.g. using its private key), and forwards the re-encrypted data to one or more data owner embodiments, which decrypt the data (e.g. using the public key provided by the aggregator embodiment). Having the aggregator embodiment decrypt and then re-encrypt the data reduces the potential for noise in the data. To hide data from the aggregator during the forwarding process, which may not be desirable in some security implementations, one data owner embodiment adds a large random value to the data before encryption and sending, and a receiving data owner removes the same random value from the data after receiving and decryption. The aggregator embodiment does not have access to the random value, and thus does not have access to the data being forwarded through the aggregator embodiment. As used herein, a random value refers to a number generated by a pseudo-random number generator using a presently known technique.

In some embodiments implementing encrypted data communications between data owner embodiments through an aggregator embodiment, a data owner prepends or appends a number of pseudo-random bits to the data to be sent before encrypting the complete message using a symmetric cipher. The aggregator embodiment does not have the symmetric key, and thus cannot decode the message. The destination data owner receives the encrypted message, decrypts it, and removes the prepended or appended bits to retrieve the original data. Prefixing or appending bits prevents the aggregator from comparing two encrypted messages and determining whether the underlying, unencrypted, messages are equal to each other. The number of bits is a security parameter, i.e. if the number of bits is L the probability that two sets of bits (prepended or appended) is the same is $2^{-L}$. For example, L might be set to 128. Another data owner embodiment exclusive-ors data to be sent using a one-time pad that is pseudo-randomly generated from a secret shared by the data owner embodiments, then sends the data through an aggregator embodiment which does not share the secret. The destination data owner embodiment exclusive-ors the received data with the same one-time pad, generated from the same secret, to recover the original data.

Data owner embodiments perform set intersection to determine the intersection of their respective datasets. An initiating data owner embodiment initializes a hash table, a one dimensional matrix with each cell storing an identifier present in the data owner embodiment's dataset, and hence usable in model training. In one data owner embodiment, empty cells hold the value zero, which is not a valid identifier. In another data owner embodiment, cells in the hash table store an encrypted binary representation of an identifier present in the data owner embodiment's dataset, with an encrypted binary representation of zero (not a valid identifier) denoting an empty cell. One data owner embodiment uses cuckoo hashing, a presently known technique in which a hash table is accessed using a set of hash functions, e.g. h1, h2, etc., until an empty cell is located. Thus, to initialize the table an embodiment identifies the set of hash functions that map a particular identifier to an empty cell in the hash table. If the set includes at least one hash function, the encrypted identifier is stored in the hash table cell with an index corresponding to the lowest hash function in the set of identified hash functions. The encrypted binary representation is generated using a homomorphic encryption technique, using the aggregator embodiment's key.

An initiating data owner embodiment sends the hash table through the aggregator embodiment to other data owner embodiments that will be contributing datasets to the federated learning process. One initiating data owner embodiment sends the hash table with its contents encrypted using a homomorphic encryption technique. The other participating data owner embodiments generate an indicator vector, a one-dimensional matrix in which a cell is set to one if the identifier in the same index of the hash table matches an indicator present in a participating data owner embodiment's dataset, and a cell is set to zero if the identifier in the same index of the hash table does not match an indicator in a participating data owner embodiment's dataset. In some other participating data owner embodiments, a cell is set to one if the identifier in the same index of the hash table matches, above a threshold amount of similarity, an indicator present in a participating data owner embodiment's dataset. Some other participating data owner embodiments decrypt the contents of an encrypted received hash table before identifier comparison, and encrypt the contents of the resulting indicator vector. The other participating data owner embodiments send their indicator vectors back to the initiating data owner embodiment, which multiplies all the received indicator vectors together with the original hash table. The result is an overall indicator vector with a cell set to one if the identifier in the same index of the hash table is in all of the participating data owner embodiments' datasets, and a cell set to zero otherwise. Using data structures other than a hash table and indicator vectors to store identifier intersection data is also possible and contemplated within the scope of the illustrative embodiments. As participating data owner embodiments send their indicator vectors back to one initiating data owner embodiment, each data owner embodiment acts as an initiating data owner embodiment, gathering data from the other prospective participants. Alternatively, only one designated data owner embodiment acts as an initiating data owner embodiment and shares the results with other data owner embodiments, but then each data owner would need to perform some extra computation to determine whether each of their identifiers appears in the intersection.

Data owner embodiments use the indicator vector to rearrange their datasets to be used in model training, so that the datasets all contain data corresponding to the same identifiers, arranged in the same order. A data owner embodiment that holds labels to be used in model training also rearranges its labels into the same order as the training datasets. One set of data owner embodiments uses an indicator vector to perform the rearranging, so that the rearranged datasets to be used in model training, as well as the labels, have rows with identifications in the set of intersections sorted in ascending order of their identifications. Rows with identifications that are not in the set of intersections are not used in model training. Techniques for performing the rearrangement, using an encrypted or unencrypted indicator vector, are presently available.

Data owner embodiments and an aggregator embodiment use the rearranged datasets and labels to train a model. In one set of embodiments, an aggregator embodiment initializes a set of model weights to random values generated using a pseudo-random number generator. Model training adjusts the model weights in a set of iterations. In each iteration, a set of data owner embodiments each compute partial weighted data, which is a sample of a data owner's own training data weighted by a previous iteration of the model. The data owner embodiments send the partial weighted data through the aggregator to a data owner embodiment that holds labels. The label-holding data owner embodiment also computes its own set of partial weighted data. The label-holding data owner embodiment sums all the sets of partial weighted data, and computes a set of differences between the sum and a set of data labels. The label holding embodiment sends the set of differences through the aggregator embodiment to the other data owner embodiments. The data owner embodiments use the set of differences to update portions of the set of weights using their training datasets, and send the updated portions to the aggregator embodiment, which concatenates the portions into an updated aggregated set of model weights and sends the updated aggregated set to the data owner embodiments for use in the next training iteration. The iterations continue for a preset number of iterations, until the aggregator embodiment determines that the model meets one or more error criteria (and thus is deemed sufficiently trained), a combination of endpoints, or another endpoint condition is reached. Then the aggregator embodiment sends the final set of aggregated model weights to one or more of the set of data owner embodiments for their own uses.

In one set of embodiments, one or more of the partial model weights, the partial weighted data, the set of differences, and the updated weight portions are sent between data owner embodiments and the aggregator embodiment in encrypted form. One set of embodiments computes one or more of the encrypted partial model weights, the encrypted partial training data weighted by a previous iteration of the model, the encrypted set of differences between a sum of the received weighted data and a set of data labels, and the encrypted updated portions of the set of weights on homomorphically encrypted forms of received data, and does not decrypt data until the final, complete set of model weights is computed.

In another set of embodiments, one or more of partial model weights, the partial weighted data, the set of differences, and the updated weight portions are sent between data owner embodiments and the aggregator embodiment in a masked form. The masked form is a sum of the transmitted data and an agreed-upon random number known to the data owner embodiments but not the aggregator embodiment. Other combinations of encryption and masking are also possible and contemplated within the scope of the illustrative embodiments.

The manner of private vertical federated learning described herein is unavailable in the presently available methods in the technological field of endeavor pertaining to machine learning and model training. A method of an embodiment described herein, when implemented to execute on a device or data processing system, comprises substantial advancement of the functionality of that device or data processing system in receiving a second set of data identifiers from a second data owner, determining, by comparing the second set of data identifiers with a first set of data identifiers of a first data owner, an intersection set of data identifiers, rearranging the data usable in federated model training by the first data owner according to the intersection set, computing a partial set of model weights using the intersection set, the training dataset, and a previous iteration of an aggregated set of model weights, sending the partial set of model weights to an aggregator, and receiving, from the aggregator, an updated aggregated set of model weights.

The illustrative embodiments are described with respect to certain types of identifiers, indicator vectors, hash tables, intersection sets, cryptographic schemes, masks, model weights, training datasets, transmissions, thresholds, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
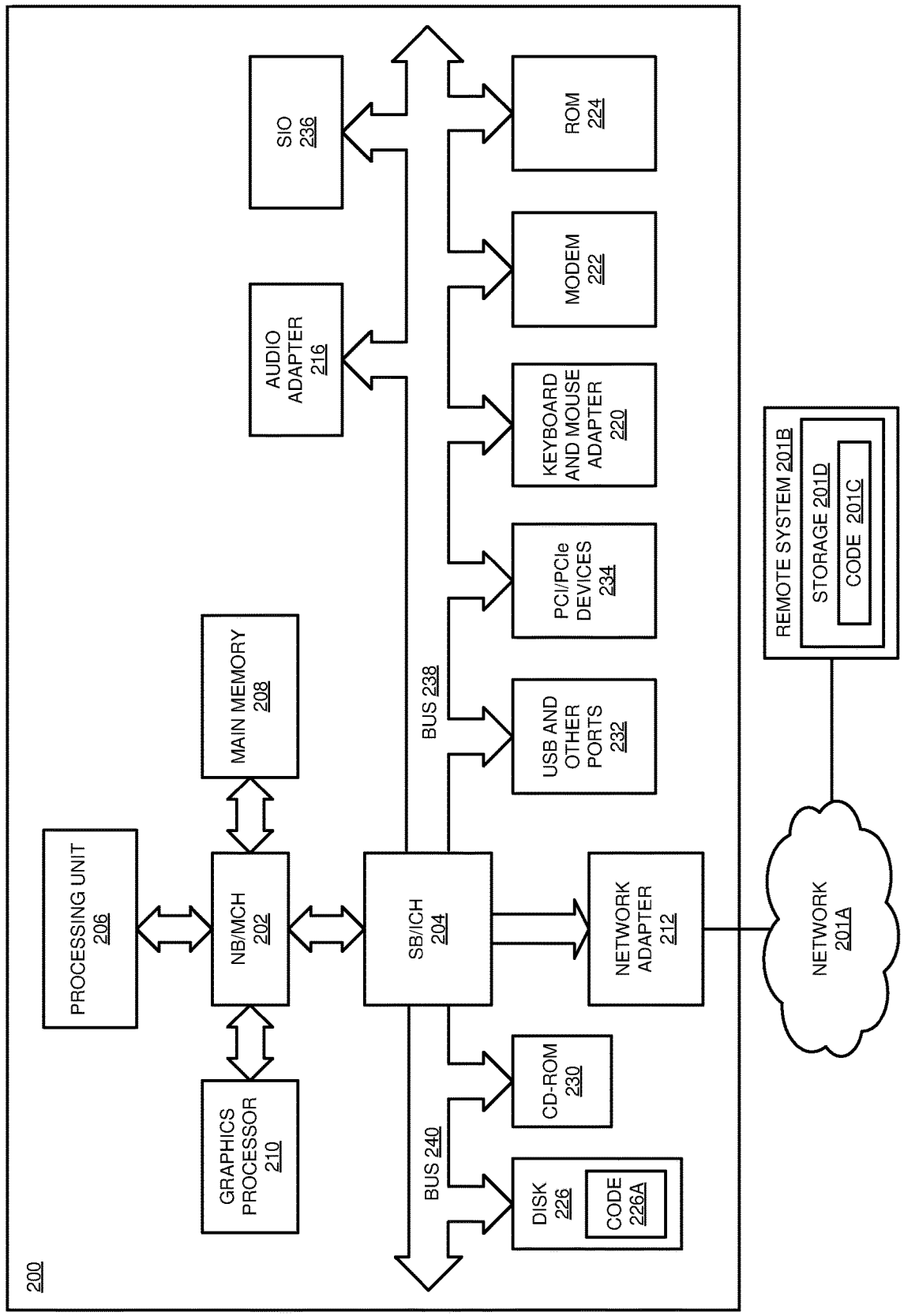
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. In particular, application 105, implemented as a data owner embodiment, executes in any of servers 104 and 106, clients 110, 112, and 114, and device 132. Application 105, implemented as an aggregator embodiment, also executes in any of servers 104 and 106, clients 110, 112, and 114, and device 132. For example, two instances of application 105, each implemented as data owner embodiments, might execute in clients 110 and 112 respectively, communicating with another instance of application 105, implemented as an aggregator embodiment and executing in server 104.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
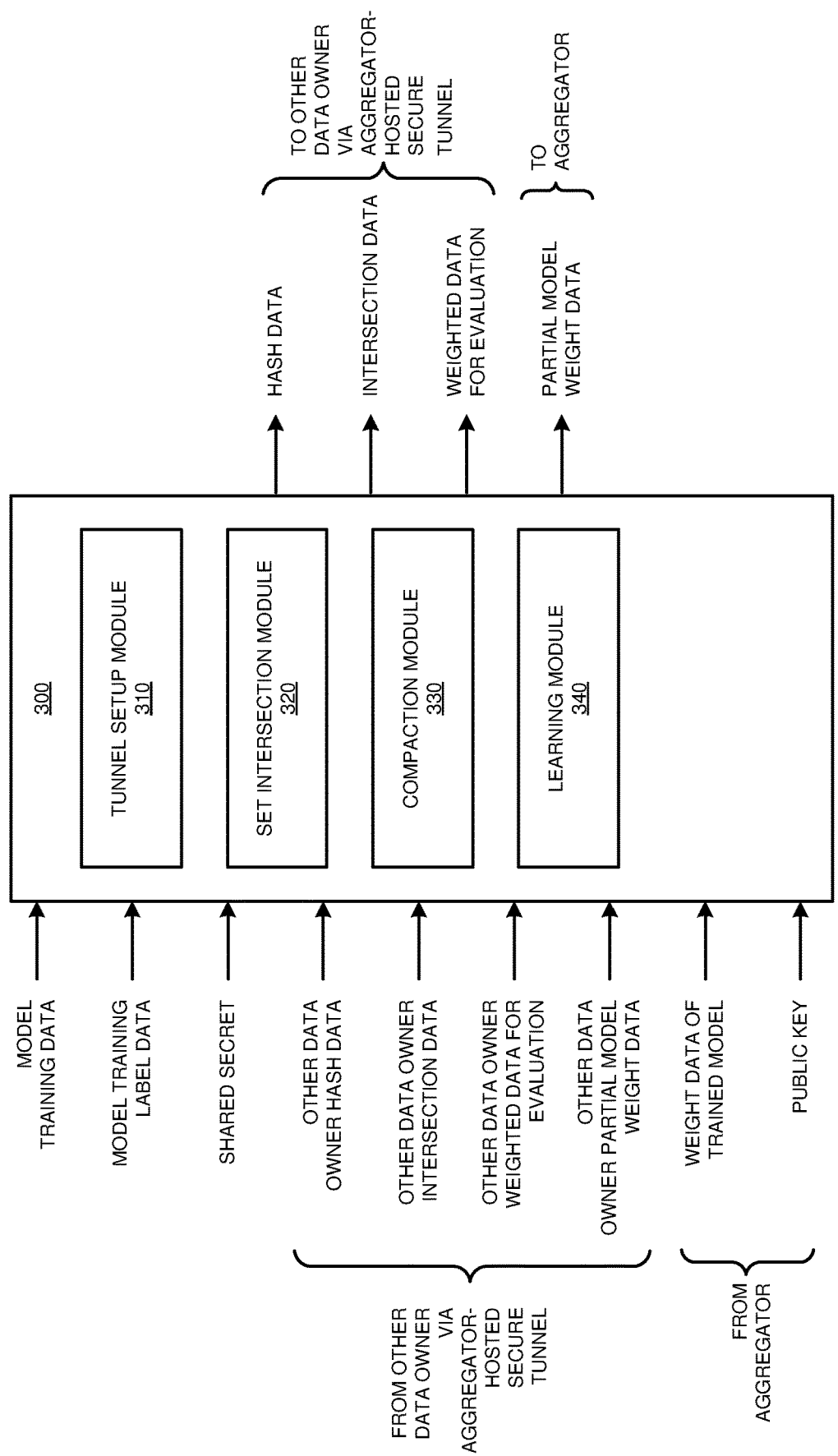
FIG. 3 depicts a block diagram of an example configuration for private vertical federated learning in accordance with an illustrative embodiment.

With reference to FIG. 3, this figure depicts a block diagram of an example configuration for private vertical federated learning in accordance with an illustrative embodiment. Application 300 is an example of application 105 in FIG. 1 and executes in any of servers 104 and 106, clients 110, 112, and 114, and device 132 in FIG. 1.

In particular, application 300 implements a data owner embodiment as described herein. In implementations sending encrypted data communications between instances of application 300 using a secure tunnel through an aggregator embodiment (depicted as application 400 in FIG. 4), the instances of application 300 use one or more encryption keys to encrypt and decrypt their communications, using presently known encryption techniques. In one set of implementations of application 300, the implementations share a secret that application 400 does not have access to. In some implementations of application 300, the secret is an encryption key usable to both encrypt and decrypt a message using a presently available technique. Other implementations of application 300 use the secret to generate a public-private encryption key pair using a presently available technique. Because the implementations of application 300 share the secret, they will generate the same key pair. To send data using a secure tunnel through an implementation of application 400, application 300 encrypts the data (e.g. using the shared key or the public key), and sends the encrypted data to application 400. Application 400 forwards the encrypted data to one or more instances of application 300, which decrypt the data (e.g. using the shared key or the private key). Because application 400 does not have access to the secret, application 400 cannot decrypt the data being forwarded.

Figure 4:
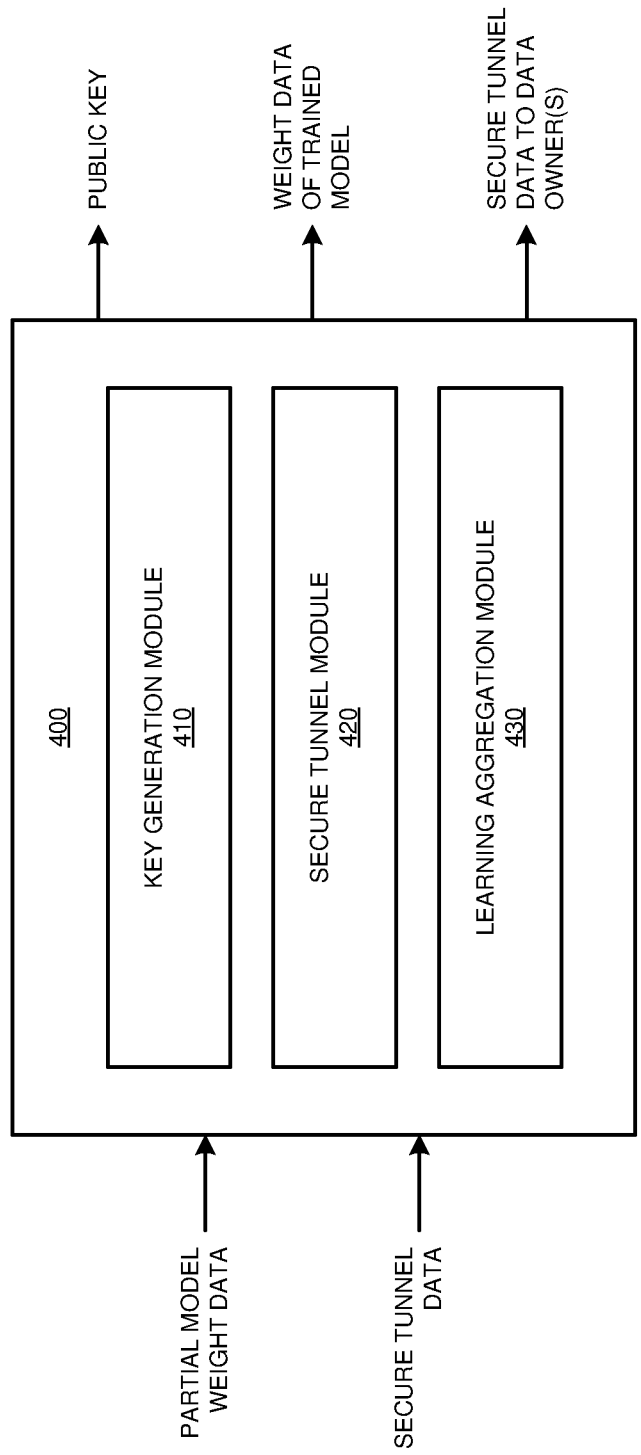
FIG. 4 depicts a block diagram of an example configuration for private vertical federated learning in accordance with an illustrative embodiment.

In other implementations sending encrypted data communications between instances of application 300 using a secure tunnel through application 400 in FIG. 4, application 300 encrypts the data (e.g. using a public key provided by application 400), and sends the encrypted data to application 400. Application 400 decrypts the data (e.g. using its private key), re-encrypts the data (e.g. using its private key), and forwards the re-encrypted data to one or more instances of application 300, which decrypt the data (e.g. using the public key provided by the aggregator embodiment). Having application 400 decrypt and then re-encrypt the data reduces the potential for noise in the data. To hide data from application 400 during the forwarding process, which may not be desirable in some security implementations, one implementation of application 300 adds a large random value to the data before encryption and sending, and a receiving implementation of application 300 removes the same random value from the data after receiving and decryption. Application 400 does not have access to the random value, and thus does not have access to the data being forwarded through itself.

In some implementations sending encrypted data communications between instances of application 300 through application 400 in FIG. 4, application 300 prepends or appends a pseudo-random number of bits to the data to be sent before encrypting the complete message using a symmetric cipher. Application 400 does not have the symmetric key, and thus cannot decode the message. The destination instance of application 300 receives the encrypted message, decrypts it, and removes the prepended or appended bits to retrieve the original data. The number of bits is a security parameter, i.e. if the number of bits is L the probability that two sets of bits (prepended or appended) is the same is $2^{-L}$. Another implementation of application 300 exclusive-ors data to be sent using a one-time pad that is pseudo-randomly generated from a secret shared by the data owner embodiments, then sends the data through application 400 which does not share the secret. The destination implementation of application 300 exclusive-ors the received data with the same one-time pad, generated from the same secret, to recover the original data.

Set intersection module 320 performs set intersection to determine the intersection of their respective datasets. An initiating instance of module 320 initializes a hash table, a one dimensional matrix with each cell storing an identifier present in the data owner embodiment's dataset, and hence usable in model training. In one implementation of module 320, empty cells hold the value zero, which is not a valid identifier. In another implementation of module 320, cells in the hash table store an encrypted binary representation of an identifier present in application 300's dataset, with an encrypted binary representation of zero (not a valid identifier) denoting an empty cell. One implementation of module 320 uses cuckoo hashing. Thus, to initialize the table module 320 identifies the set of hash functions that map a particular identifier to an empty cell in the hash table. If the set includes at least one hash function, the encrypted identifier is stored in the hash table cell with an index corresponding to the lowest hash function in the set of identified hash functions. The encrypted binary representation is generated using a homomorphic encryption technique, using the application 400's key.

Module 320 sends the hash table through the aggregator embodiment to other instances of module 320, within application 300, that will be contributing datasets to the federated learning process. One implementation of module 320 sends the hash table with its contents encrypted using a homomorphic encryption technique. The other instances of module 320 generate an indicator vector, a one-dimensional matrix in which a cell is set to one if the identifier in the same index of the hash table matches an indicator present in a participating instance of application 300's dataset, and a cell is set to zero if the identifier in the same index of the hash table does not match an indicator in a participating instance of application 300's dataset. In some other implementations of module 320, a cell is set to one if the identifier in the same index of the hash table matches, above a threshold amount of similarity, an indicator present in a participating instance of application 300's dataset. Some other implementations of module 320 decrypt the contents of an encrypted received hash table before identifier comparison, and encrypt the contents of the resulting indicator vector. Some other implementations of module 320 do not decrypt the contents of the received hash table are not decrypted; instead, identifier comparison is performed using an identifier comparison function that operates on encrypted data, and the contents of the resulting indicator vector do not need encryption. The other implementations of module 320 send their indicator vectors back to the initiating implementation of module 320, which multiplies all the received indicator vectors together with the original hash table. The result is an overall indicator vector with a cell set to one if the identifier in the same index of the hash table is in all of the participating data owner embodiments' datasets, and a cell set to zero otherwise. As participating implementations of module 320 send their indicator vectors back to one initiating implementation of module 320, each implementation of module 320 acts as an initiator, gathering data from the other prospective participants. Alternatively, only one designated implementation of module 320 acts as an initiator and shares the results with other implementations of module 320, but then each data owner would need to perform some extra computation to determine whether each of their identifiers appears in the intersection.

Instances of compaction module 330 use the indicator vector to rearrange their datasets to be used in model training, so that the datasets all contain data corresponding to the same identifiers, arranged in the same order. An instance of application 300 that holds labels to be used in model training also rearranges its labels into the same order as the training datasets. One set of instances of module 330 uses an indicator vector to perform the rearranging, so that the rearranged datasets to be used in model training, as well as the labels, have rows with identifications in the set of intersections sorted in ascending order of their identifications. Rows with identifications that are not in the set of intersections are not used in model training.

Instances of learning module 340 and application 400 use the rearranged datasets and labels to train a model. In one set of implementations, application 400 initializes a set of model weights to random values generated using a pseudo-random number generator. Model training adjusts the model weights in a set of iterations. In each iteration, instances of module 340 each compute partial weighted data, which is a sample of a data owner's own training data weighted by a previous iteration of the model. The instances send the partial weighted data through application 400 to an instance of module 340 that holds labels. Label-holding module 340 also computes its own set of partial weighted data. Label-holding module 340 sums all the sets of partial weighted data, and computes a set of differences between the sum and a set of data labels. Label-holding module 340 sends the set of differences through application 400 to the other instances of module 340. The instances of module 340 use the set of differences to update portions of the set of weights using their training datasets, and send the updated portions to application 400, which concatenates the portions into an updated aggregated set of model weights and sends the updated aggregated set to modules 340 for use in the next training iteration. The iterations continue for a preset number of iterations, until application 400 determines that the model meets one or more error criteria (and thus is deemed sufficiently trained), a combination of endpoints, or another endpoint condition is reached. Then application 400 sends the final set of model weights to one or more of the set of data owner embodiments for their own uses.

In one set of implementations, one or more of the partial model weights, the partial weighted data, the set of differences, and the updated weight portions are sent between instances of module 340 and application 400 in encrypted form. One set of instances of module 340 computes one or more of the encrypted partial model weights, the encrypted partial training data weighted by a previous iteration of the model, the encrypted set of differences between a sum of the received weighted data and a set of data labels, and the encrypted updated portions of the set of weights on homomorphically encrypted forms of received data, and does not decrypt data until the final, complete set of model weights is computed.

In another set of implementations, one or more of partial model weights, the partial weighted data, the set of differences, and the updated weight portions are sent between instances of module 340 and application 400 in a masked form. The masked form is a sum of the transmitted data and an agreed-upon random number known to the instances of module 340 but not application 400.

With reference to FIG. 4, this figure depicts a block diagram of an example configuration for private vertical federated learning in accordance with an illustrative embodiment. Application 400 is an example of application 105 in FIG. 1 and executes in any of servers 104 and 106, clients 110, 112, and 114, and device 132 in FIG. 1.

In particular, application 400 implements an aggregator embodiment as described herein. In one set of implementations, key generation module 410 uses a presently known technique to generate a public-private encryption key pair, or receives a public-private encryption key pair from another source, and provides the public key to one or more instances of application 300 for use in decrypting model weight data communicated from application 400. In one set of implementations, module 410 generates one key pair, and provides all instances of application 300 with the same public key. In another set of implementations, module 410 generates multiple key pairs, and provides instances of application 300 with different public keys. In another set of implementations, module 410 generates separate key pairs for each instance of application 300, and provides each instance with its own public key.

Secure tunnel module 420 implements encrypted data communications between instances of application 300. In particular, instances of application 300 use one or more encryption keys to encrypt and decrypt their communications. To send data via module 420, an instance of application 300 encrypts data to be sent (e.g. using the shared key or the public key), and sends the encrypted data to module 420. Module 420 forwards the encrypted data to one or more instances of application 300, which decrypt the data (e.g. using the shared key or the private key). Because module 420 does not have access to the secret or key(s), module 420 cannot decrypt the data being forwarded.

Learning aggregation module 430 participates with learning module 340 in FIG. 3 to train a model. In one implementation, module 430 initializes a set of model weights to random values generated using a pseudo-random number generator. In each model training iteration, instances of module 340 send the updated portions of the set of weights to module 430, which concatenates the portions into an updated aggregated set of model weights and sends the updated aggregated set to instances of module 340. The iterations continue for a preset number of iterations, until module 430 determines that the model meets one or more error criteria (and thus is deemed sufficiently trained), a combination of endpoints, or another endpoint condition is reached. Then module 430 sends the final set of aggregated model weights to one or more of the set of data owner embodiments for their own uses.

In one set of implementations, one or more of the partial model weights, the partial weighted data, the set of differences, and the updated weight portions are sent between modules 340 and 430 in encrypted form. One set of implementations computes one or more of the encrypted partial model weights, the encrypted partial training data weighted by a previous iteration of the model, the encrypted set of differences between a sum of the received weighted data and a set of data labels, and the encrypted updated portions of the set of weights on homomorphically encrypted forms of received data, and does not decrypt data until the final, complete set of model weights is computed.

In another set of embodiments, one or more of partial model weights, the partial weighted data, the set of differences, and the updated weight portions are sent between modules 340 and 430 in a masked form. The masked form is a sum of the transmitted data and an agreed-upon random number known to the instances of module 340 but not application 400.

Figure 5:
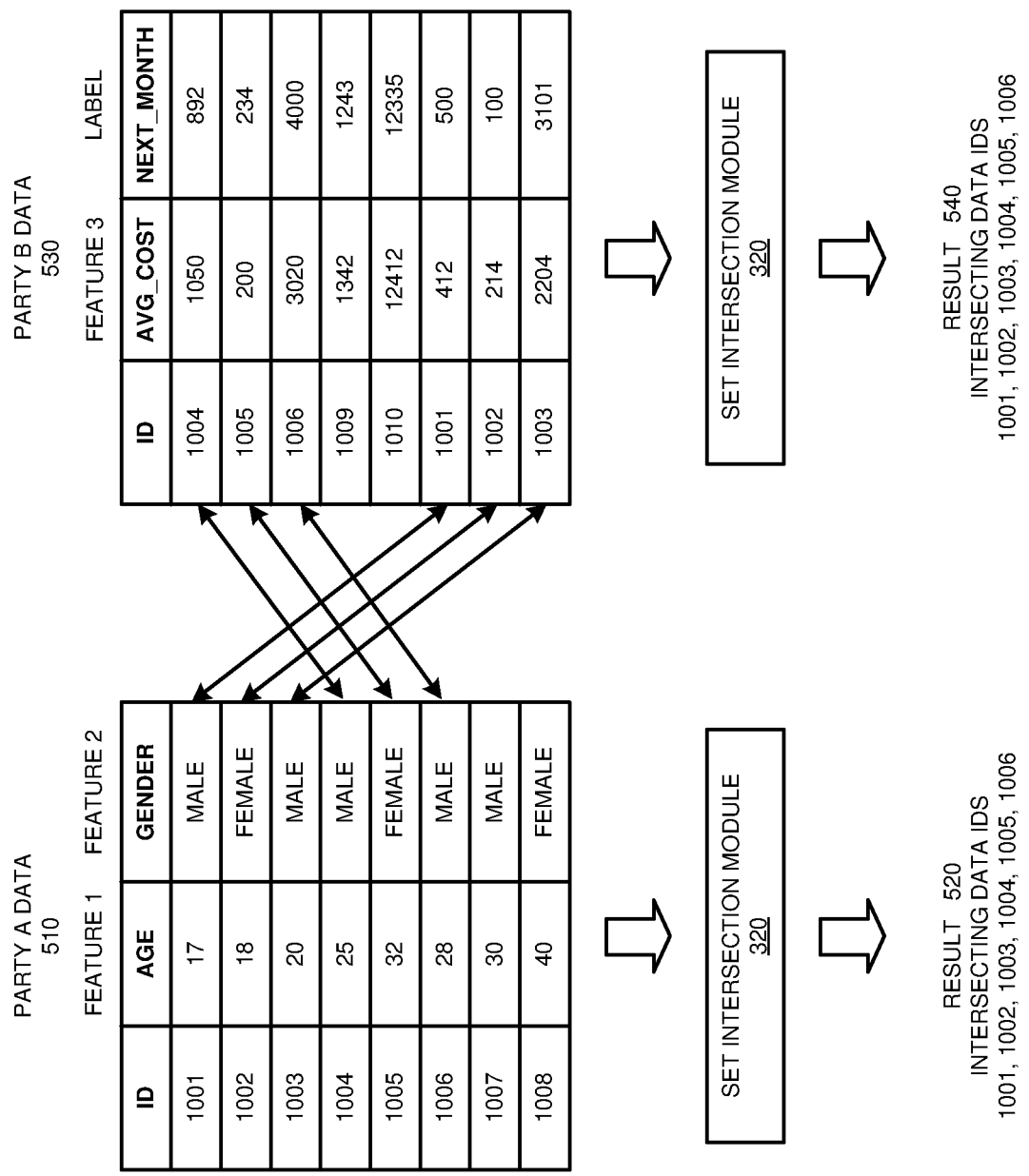
FIG. 5 depicts an example of private vertical federated learning in accordance with an illustrative embodiment.

With reference to FIG. 5, this figure depicts an example of private vertical federated learning in accordance with an illustrative embodiment. The example can be executed using application 300 in FIG. 3 and application 400 in FIG. 4. Set intersection module 320 is the same as set intersection module 320 in FIG. 3.

In particular, FIG. 5 depicts an example of performing set intersection to determine the intersection of the datasets of two instances of application 300, one holding Party A data 510 and the other holding Party B data 530. An initiating instance of set intersection module 320 (e.g., Party A) initializes a hash table, a one dimensional matrix with each cell storing an identifier present in the initializing instance's dataset. In one implementation, cells in the hash table store an encrypted binary representation of an identifier present in the initializing instance's dataset. The initializing instance of module 320 sends the initialized hash table through application 400 (not shown) to another instance of module 320 (e.g., Party B). Party B's instance of module 320 generates an indicator vector, a one-dimensional matrix in which a cell is set to one if the identifier in the same index of the hash table matches an indicator present in Party B's dataset, and a cell is set to zero if the identifier in the same index of the hash table does not match an indicator in Party B's dataset. Some implementations of module 320 decrypt the contents of an encrypted received hash table before identifier comparison, and encrypt the contents of the resulting indicator vector. Some other implementations of module 320 do not decrypt the contents of the received hash table; instead, identifier comparison is performed using an identifier comparison function that operates on encrypted data, and the contents of the resulting indicator vector do not need encryption. Party B's module 320 sends its indicator vector back to Party A's module 320, which multiplies all the received indicator vectors together with the original hash table. The result is an overall indicator vector with a cell set to one if the identifier in the same index of the hash table is in all of the participating data owner embodiments' datasets, and a cell set to zero otherwise. This result is described in result 520 and result 540.

Figure 6:
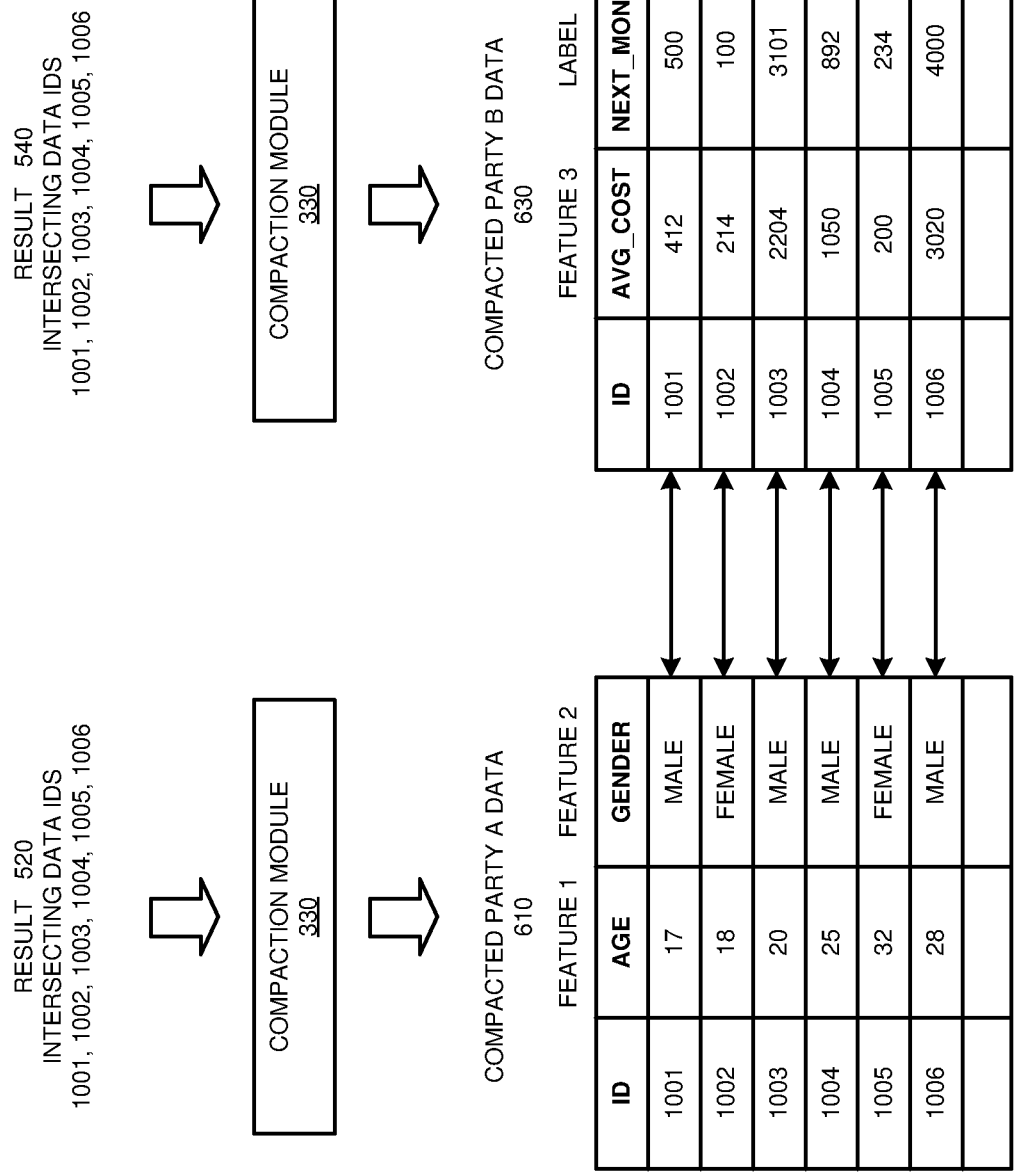
FIG. 6 depicts a continued example of private vertical federated learning in accordance with an illustrative embodiment.

With reference to FIG. 6, this figure depicts a continued example of private vertical federated learning in accordance with an illustrative embodiment. Compaction module 330 is the same as compaction module 330 in FIG. 3. Results 520 and 540 are the same as results 520 and 540 in FIG. 5.

As depicted, an instance of compaction module 330 (e.g., Party A) uses result 520 to rearrange its dataset into compacted Party A data 610. Another instance of compaction module 330 (e.g., Party B) uses result 540 to rearrange its dataset into compacted Party B data 630. Note that both datasets contain data corresponding to the same identifiers, arranged in the same order.

Figure 7:
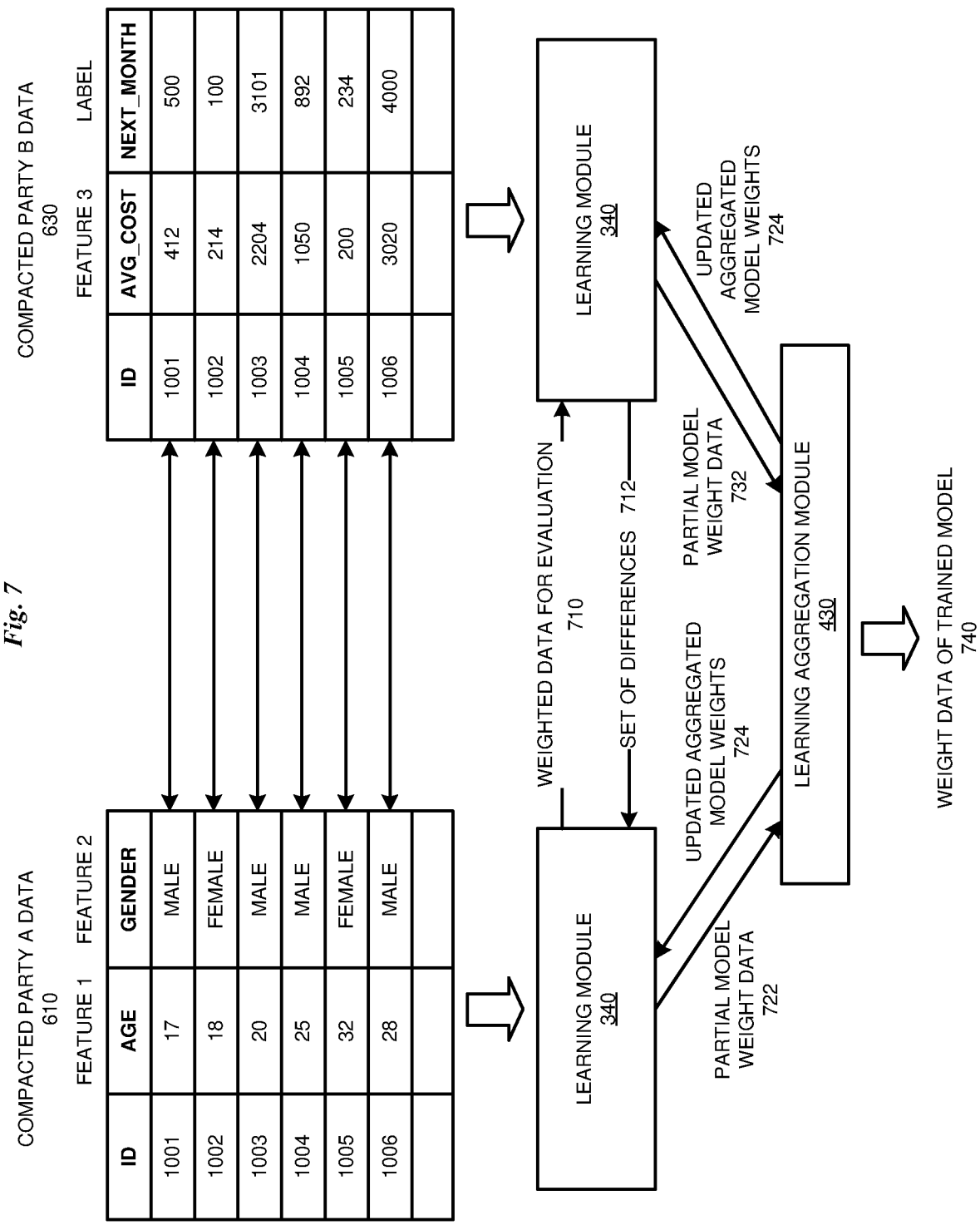
FIG. 7 depicts a continued example of private vertical federated learning in accordance with an illustrative embodiment.

With reference to FIG. 7, this figure depicts a continued example of private vertical federated learning in accordance with an illustrative embodiment. Learning module 340 is the same as learning module 340 in FIG. 3. Learning aggregation module 430 is the same as learning aggregation module 430 in FIG. 4. Compacted Party A data 610 and compacted Party B data 630 are the same as compacted Party A data 610 and compacted Party B data 630 in FIG. 6.

FIG. 7 depicts use of data 610 and 620 to train a model. In particular, module 430 initializes a set of model weights to random values generated using a pseudo-random number generator, and provides that data to instances of module 340 as model data to begin training with. In each model training iteration, instances of module 340 each compute partial weighted data, which is a sample of a data owner's own training data weighted by a previous iteration of the model. Because data 630 includes labels for the data, one instance of module 340 sends its partial weighted data 710 to the instance of module 340 which holds data 630. The receiving module 340 sums all the data 710, computes a set of differences between the sum and a set of data labels, and sends set of differences 712 to the other instances of module 340. One instance of module 340 uses set of differences 712 to update portions of the set of weights using its training datasets, and send updated partial model weight data 722 to module 430. Another instance of module 340 uses set of differences 712 to update portions of the set of weights using its training datasets, and send updated partial model weight data 732 to module 430. Module 430 concatenates data 722 and 732 into updated aggregated model weights 724 and sends data 724 to both instances of module 340 for use in the next training iteration. The iterations continue for a preset number of iterations, until module 430 determines that the model meets one or more error criteria (and thus is deemed sufficiently trained), a combination of endpoints, or another endpoint condition is reached. The end result is depicted as weight data of trained model 740.

Figure 8:
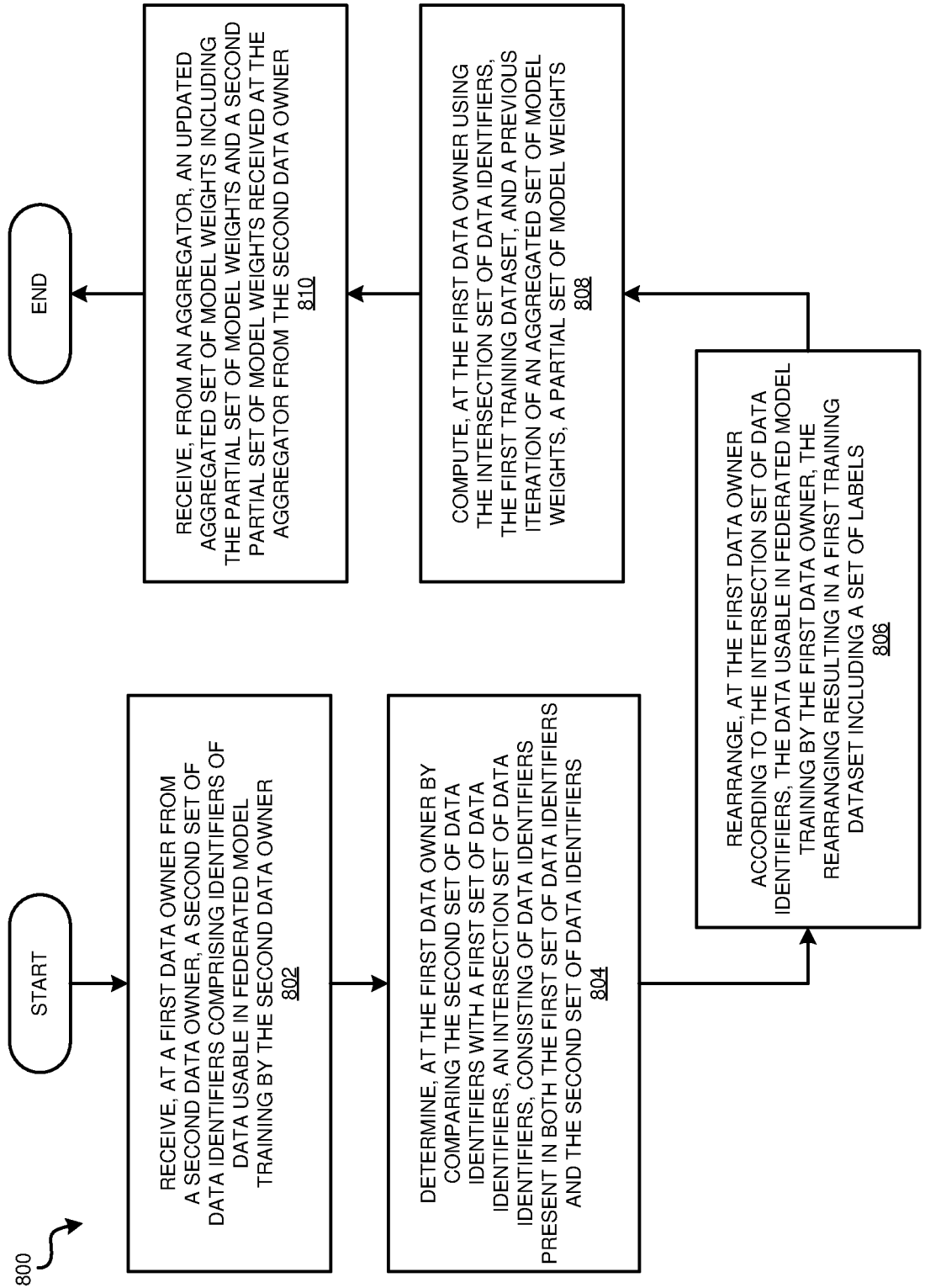
FIG. 8 depicts a flowchart of an example process for private vertical federated learning in accordance with an illustrative embodiment.

With reference to FIG. 8, this figure depicts a flowchart of an example process for private vertical federated learning in accordance with an illustrative embodiment. Process 800 can be implemented in application 300 in FIG. 3.

In block 802, the application receives, at a first data owner from a second data owner, a second set of data identifiers comprising identifiers of data usable in federated model training by the second data owner. In block 804, the application determines, at the first data owner by comparing the second set of data identifiers with a first set of data identifiers, an intersection set of data identifiers, consisting of data identifiers present in both the first set of data identifiers and the second set of data identifiers. In block 806, the application rearranges, at the first data owner according to the intersection set of data identifiers, the data usable in federated model training by the first data owner, the rearranging resulting in a first training dataset including a set of labels. In block 808, the application computes, at the first data owner using the intersection set of data identifiers, the first training dataset, and a previous iteration of an aggregated set of model weights, a partial set of model weights. In block 810, the application receives, from an aggregator, an updated aggregated set of model weights including the partial set of model weights and a second partial set of model weights received at the aggregator from the second data owner. Then the application ends.

Figure 9:
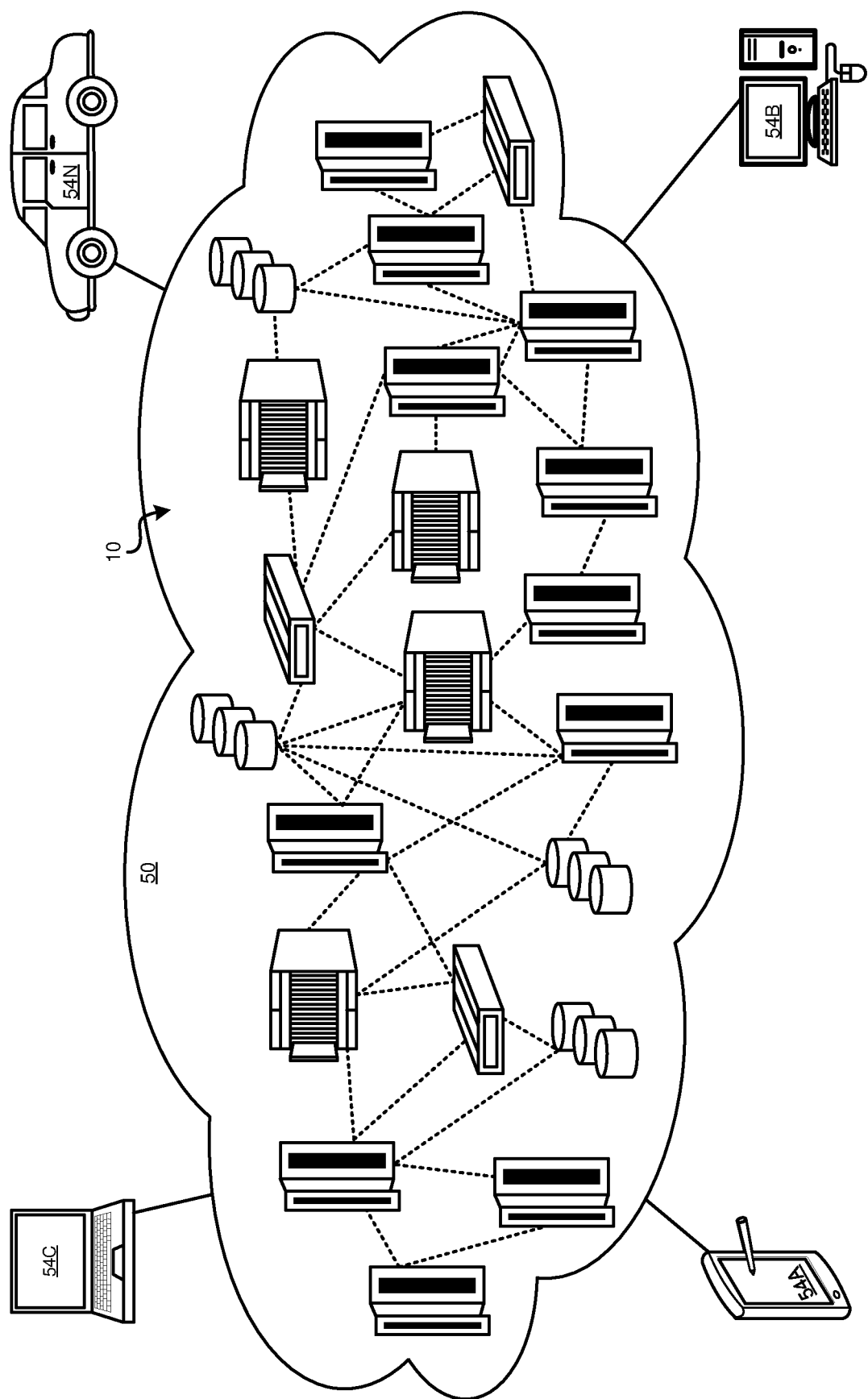
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 10:
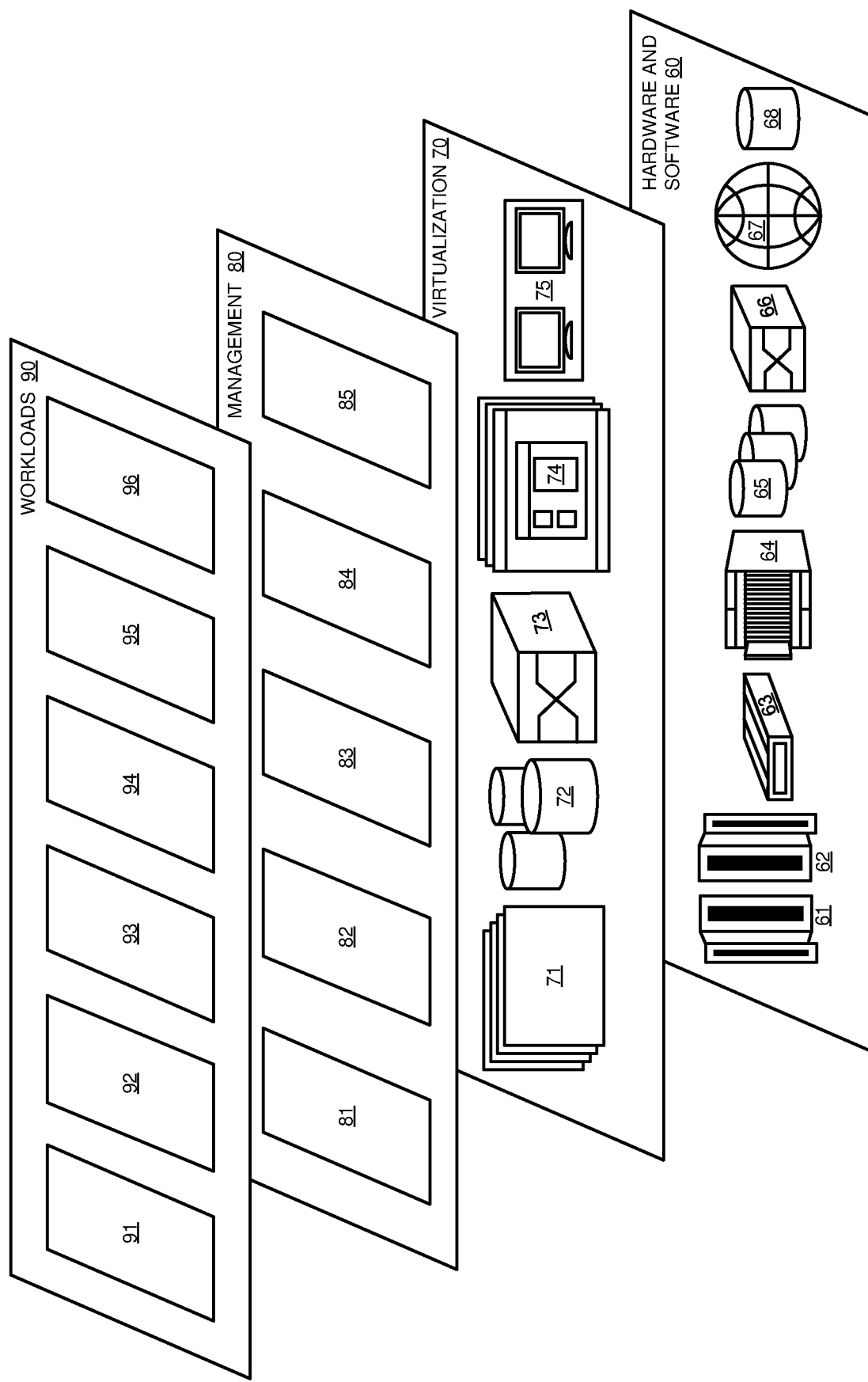
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for private vertical federated learning and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    receiving, at a first data owner from a second data owner, a second set of data identifiers, the second set of data identifiers comprising identifiers of data usable in federated model training by the second data owner;
    determining, at the first data owner by comparing the second set of data identifiers with a first set of data identifiers, an intersection set of data identifiers, the first set of data identifiers comprising identifiers of data usable in federated model training by the first data owner, the intersection set of data identifiers consisting of data identifiers present in both the first set of data identifiers and the second set of data identifiers, wherein the intersection set of data identifiers is stored in ascending numerical order;
    rearranging, at the first data owner according to the intersection set of data identifiers, the data usable in federated model training by the first data owner, the rearranging resulting in a first training dataset sorted into ascending order of data identifiers in the intersection set of data identifiers, the first training dataset comprising a set of labels;
    performing a training iteration of a model by computing, at the first data owner, a first partial set of model weights, the first partial set of model weights computed using the intersection set of data identifiers, the first training dataset, and a previous iteration of an aggregated set of model weights computed by the first data owner and the second data owner in a previous training iteration of the model;
    receiving, at the first data owner from an aggregator, an updated aggregated set of model weights, the updated aggregated set of model weights comprising the first partial set of model weights and a second partial set of model weights received at the aggregator from the second data owner, the second partial set of model weights computed at the second data owner during the training iteration of the model, wherein the updated aggregated set of model weights comprises a result of the training iteration of the model; and
    receiving, at the first data owner from the aggregator subsequent to performance of a plurality of training iterations including the training iteration, a trained version of the model, the trained version of the model comprising a final aggregated set of model weights computed at the first data owner and the second data owner.

2. The computer-implemented method of claim 1, wherein the second set of data identifiers is communicated from the second data owner through the aggregator to the first data owner.

3. The computer-implemented method of claim 1, wherein the second set of data identifiers is communicated from the second data owner through the aggregator to the first data owner in homomorphically encrypted form, and wherein a decryption key usable to decrypt the second set of data identifiers is unavailable to the aggregator.

4. The computer-implemented method of claim 1, wherein the intersection set of data identifiers comprises a homomorphically encrypted indicator vector.

5. The computer-implemented method of claim 4, wherein the homomorphically encrypted indicator vector is determined by comparing a homomorphically encrypted form of the second set of data identifiers with a homomorphically encrypted form of the first set of data identifiers.

6. The computer-implemented method of claim 1, wherein the intersection set of data identifiers is communicated from the first data owner through the aggregator to the second data owner.

7. The computer-implemented method of claim 1, wherein the intersection set of data identifiers is communicated from the first data owner through the aggregator to the second data owner in homomorphically encrypted form, and wherein a decryption key usable to decrypt the intersection set of data identifiers is unavailable to the aggregator.

8. The computer-implemented method of claim 1, wherein the previous iteration of the aggregated set of model weights is received at the first data owner from the aggregator in encrypted form, wherein a decryption key usable to decrypt the previous iteration of the aggregated set of model weights is available to the first data owner.

9. The computer-implemented method of claim 1, wherein computing the first partial set of model weights comprises:
    computing first partial weighted data, the first partial weighted data comprising data from the first training dataset weighted by the previous iteration of the aggregated set of model weights;
    receiving, from the second data owner, second partial weighted data, the second partial weighted data comprising data from the second training dataset weighted by the previous iteration of the aggregated set of model weights;
    computing a set of differences between the set of labels and a sum of the first partial weighted data and the second partial weighted data; and computing, using the set of differences and the previous iteration of the aggregated set of model weights, the first partial set of weights.

10. The computer-implemented method of claim 9, wherein the second partial weighted data is communicated from the second data owner through the aggregator to the first data owner in homomorphically encrypted form, and wherein a decryption key usable to decrypt the second partial weighted data is unavailable to the aggregator.

11. The computer-implemented method of claim 9, wherein the set of differences is computed using a homomorphically encrypted form of the first partial weighted data and a homomorphically encrypted form of the second partial weighted data, and the set of differences is in homomorphically encrypted form.

12. The computer-implemented method of claim 9, wherein the partial set of weights is computed using a homomorphically encrypted form of the set of differences, and the partial set of weights is in homomorphically encrypted form.

13. A computer program product for vertical federated learning, the computer program product comprising:
one or more computer readable storage media, and program instructions collectively stored on the one or more computer readable storage media, the stored program instructions comprising:
program instructions to receive, at a first data owner from a second data owner, a second set of data identifiers, the second set of data identifiers comprising identifiers of data usable in federated model training by the second data owner;
program instructions to determine, at the first data owner by comparing the second set of data identifiers with a first set of data identifiers, an intersection set of data identifiers, the first set of data identifiers comprising identifiers of data usable in federated model training by the first data owner, the intersection set of data identifiers consisting of data identifiers present in both the first set of data identifiers and the second set of data identifiers, wherein the intersection set of data identifiers is stored in ascending numerical order;
program instructions to rearrange, at the first data owner according to the intersection set of data identifiers, the data usable in federated model training by the first data owner, the rearranging resulting in a first training dataset sorted into ascending order of data identifiers in the intersection set of data identifiers, the first training dataset comprising a set of labels;
program instructions to perform a training iteration of a model by computing, at the first data owner, a first partial set of model weights, the first partial set of model weights computed using the intersection set of data identifiers, the first training dataset, and a previous iteration of an aggregated set of model weights computed by the first data owner and the second data owner in a previous training iteration of the model;
program instructions to receive, at the first data owner from an aggregator, an updated aggregated set of model weights, the updated aggregated set of model weights comprising the first partial set of model weights and a second partial set of model weights received at the aggregator from the second data owner, the second partial set of model weights computed at the second data owner during the training iteration of the model, wherein the updated aggregated set of model weights comprises a result of the training iteration of the model; and program instructions to receive, at the first data owner from the aggregator subsequent to performance of a plurality of training iterations including the training iteration, a trained version of the model, the trained version of the model comprising a final aggregated set of model weights computed at the first data owner and the second data owner.

14. The computer program product of claim 13, wherein the second set of data identifiers is communicated from the second data owner through the aggregator to the first data owner.

15. The computer program product of claim 13, wherein the second set of data identifiers is communicated from the second data owner through the aggregator to the first data owner in homomorphically encrypted form, and wherein a decryption key usable to decrypt the second set of data identifiers is unavailable to the aggregator.

16. The computer program product of claim 13, wherein the intersection set of data identifiers comprises a homomorphically encrypted indicator vector.

17. The computer program product of claim 13, wherein the stored program instructions are stored in the at least one of the one or more storage media of a local data processing system, and wherein the stored program instructions are transferred over a network from a remote data processing system.

18. The computer program product of claim 13, wherein the stored program instructions are stored in the at least one of the one or more storage media of a server data processing system, and wherein the stored program instructions are downloaded over a network to a remote data processing system for use in a computer readable storage device associated with the remote data processing system.

19. The computer program product of claim 13, wherein the computer program product is provided as a service in a cloud environment.

20. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:
program instructions to receive, at a first data owner from a second data owner, a second set of data identifiers, the second set of data identifiers comprising identifiers of data usable in federated model training by the second data owner;
program instructions to determine, at the first data owner by comparing the second set of data identifiers with a first set of data identifiers, an intersection set of data identifiers, the first set of data identifiers comprising identifiers of data usable in federated model training by the first data owner, the intersection set of data identifiers consisting of data identifiers present in both the first set of data identifiers and the second set of data identifiers, wherein the intersection set of data identifiers is stored in ascending numerical order;
program instructions to rearrange, at the first data owner according to the intersection set of data identifiers, the data usable in federated model training by the first data owner, the rearranging resulting in a first training dataset sorted into ascending order of data identifiers in the intersection set of data identifiers, the first training dataset comprising a set of labels;
program instructions to perform a training iteration of a model by computing, at the first data owner, a first partial set of model weights, the first partial set of model weights computed using the intersection set of data identifiers, the first training dataset, and a previous iteration of an aggregated set of model weights computed by the first data owner and the second data owner in a previous training iteration of the model;

program instructions to receive, at the first data owner from an aggregator, an updated aggregated set of model weights, the updated aggregated set of model weights comprising the first partial set of model weights and a second partial set of model weights received at the aggregator from the second data owner, the second partial set of model weights computed at the second data owner during the training iteration of the model, wherein the updated aggregated set of model weights comprises a result of the training iteration of the model; and program instructions to receive, at the first data owner from the aggregator subsequent to performance of a plurality of training iterations including the training iteration, a trained version of the model, the trained version of the model comprising a final aggregated set of model weights computed at the first data owner and the second data owner.

* * * * *